United States Patent
Squicciarini

(10) Patent No.: US 9,434,803 B2
(45) Date of Patent: Sep. 6, 2016

(54) REVERSE EMULSION BREAKER POLYMERS

(71) Applicant: Ecolab USA Inc., St. Paul, MN (US)

(72) Inventor: Michael Squicciarini, Richmond, TX (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/043,017

(22) Filed: Feb. 12, 2016

(65) Prior Publication Data

US 2016/0208034 A1    Jul. 21, 2016

Related U.S. Application Data

(62) Division of application No. 14/598,034, filed on Jan. 15, 2015, now Pat. No. 9,260,545.

(51) Int. Cl.
    *C08F 22/38*    (2006.01)
    *C08L 33/24*    (2006.01)
    *C08F 220/56*    (2006.01)
    *C08F 220/54*    (2006.01)

(52) U.S. Cl.
    CPC ............ *C08F 220/56* (2013.01); *C08F 220/54* (2013.01)

(58) Field of Classification Search
    CPC ............ C08F 22/38; C08L 33/24; C09K 8/68
    USPC ............ 516/136; 44/301, 437; 210/698, 701; 526/303.1, 307, 307.2
    See application file for complete search history.

(56) References Cited

U.S. PATENT DOCUMENTS

| | | |
|---|---|---|
| 4,741,835 A | 5/1988 | Jacques et al. |
| 4,981,936 A | 1/1991 | Good, Jr. et al. |
| 5,921,912 A | 7/1999 | Hart et al. |
| 7,645,725 B2 | 1/2010 | Weaver et al. |
| 7,994,112 B2 | 8/2011 | Vanpachtenbeke et al. |
| 8,530,597 B2 | 9/2013 | Kurian et al. |
| 2006/0237372 A1 | 10/2006 | Arciszewski et al. |
| 2011/0147306 A1 | 6/2011 | Polizzotti et al. |
| 2011/0253599 A1 | 10/2011 | Cross et al. |
| 2012/0130037 A1* | 5/2012 | Querci .............. C08F 220/56 526/263 |
| 2012/0171301 A1 | 7/2012 | Koenig et al. |

FOREIGN PATENT DOCUMENTS

| | | |
|---|---|---|
| CN | 103788289 A | 5/2014 |
| EP | 0 377 313 A2 | 7/1990 |
| WO | 2010/107554 A2 | 9/2010 |

* cited by examiner

*Primary Examiner* — Kelechi Egwim
(74) *Attorney, Agent, or Firm* — Senniger Powers LLP

(57) ABSTRACT

The present invention generally relates to methods for resolving water and oil emulsions in the produced fluid of an oil production system comprising adding a reverse emulsion breaker to the produced fluid of the crude oil production system in an amount effective for resolving an oil-in-water emulsion. In particular, these methods for resolving an oil-in-water emulsion can be used in separation processes where the oil and solids in the produced fluid are separated from the produced water in the produced fluid.

19 Claims, 1 Drawing Sheet

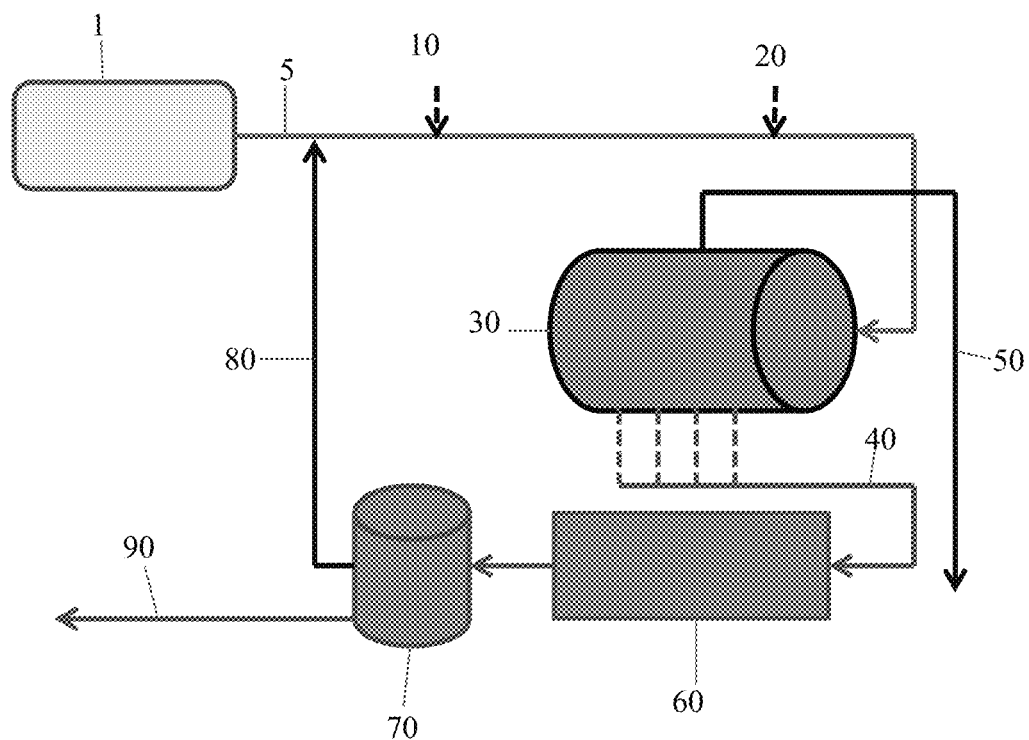

REVERSE EMULSION BREAKER POLYMERS

CROSS-REFERENCE TO RELATED APPLICATION

This application is a divisional of U.S. Non-Provisional patent application Ser. No. 14/598,034, filed Jan. 15, 2015, the entirety of which is incorporated herein by reference.

FIELD OF THE INVENTION

The present invention generally relates to methods for resolving water and oil emulsions as the produced fluids of an oil production system comprising adding a reverse emulsion breaker to the produced fluid of the crude oil production system in an amount effective for resolving an oil-in-water emulsion. In particular, these methods for resolving an oil-in-water emulsion can be used in separation processes where the oil and solids in the produced fluid are separated from the produced water in the produced fluid.

BACKGROUND OF THE INVENTION

Oil-in-water and water-in-oil-in-water emulsions can occur in many industrial systems. For example, these emulsions are a problem in many energy extraction systems because the produced fluids contain oil and solids dispersed in the produced water and separation of the oil and solids from the water is needed to comply with the oil sales specifications and to provide acceptable specifications before the water can be disposed or re-used.

In particular, oil-in-water and water-in-oil-in-water emulsions can be problems in produced fluid (steam assisted gravity drainage (SAGD), steam flood, etc.) separation processes where the oil and solids in the produced fluid are separated from the produced water in the produced fluid.

For example, SAGD operations inject steam into geological formations to stimulate the production of bitumen or heavy hydrocarbon. Oil sands deposits in Alberta, Canada represent an area where this process is extensively used. Pairs of horizontal wells are bored into the oil-containing formation. The upper well injects steam and the lower well which is positioned below the steam injection line, continuously extracts a complex emulsion. That emulsion contains bitumen and water. The emulsion is broken; the bitumen is sent for upgrading/refining, while the produced water (separated from the emulsion) is treated and reused as feedwater for the steam generators.

SUMMARY OF THE INVENTION

One aspect of the invention is a method of resolving a reverse emulsion in produced fluid of an oil production system comprising adding a reverse emulsion breaker to a produced fluid of the oil production system in an amount effective for resolving the reverse emulsion, the reverse emulsion breaker comprising a terpolymer, the terpolymer comprising repeat units of Formulae 1, 2, and 3:

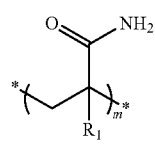

Formula 1

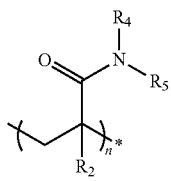

Formula 2

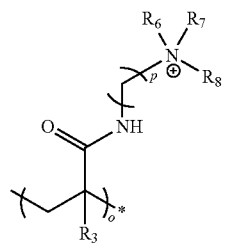

Formula 3 wherein $R_1$, $R_2$, and $R_3$ are independently hydrogen or alkyl; $R_4$, $R_5$, $R_6$, $R_7$, and $R_8$ are independently alkyl; p is an integer from 1 to 6; and m, n, and o are integers wherein the molecular weight of the terpolymer is from about 20,000 to about 20,000,000 Daltons.

Another aspect of the invention is a reverse emulsion breaker comprising a reaction product of a polymerization mixture comprising the monomers of Formulae 10, 20, and 30:

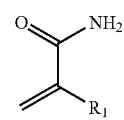

Formula 10

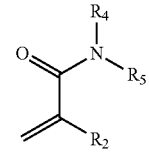

Formula 20

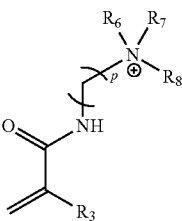

Formula 30 wherein $R_1$, $R_2$, and $R_3$ are independently hydrogen or alkyl; $R_4$, $R_5$, $R_6$, $R_7$, and $R_8$ are independently alkyl; p is an integer from 1 to 6; and m, n, and o are integers wherein the molecular weight of the terpolymer is from about 20,000 to about 20,000,000 Daltons.

Other objects and features will be in part apparent and in part pointed out hereinafter.

BRIEF DESCRIPTION OF THE DRAWINGS

FIG. 1 is a schematic of a separation system to separate solids, oil, and water in an emulsified hydrocarbon fluid.

Corresponding reference characters indicate corresponding parts throughout the drawings.

DESCRIPTION OF THE PREFERRED EMBODIMENTS

The present invention is directed to methods for the improved separation of water and oil in oil production and processing operations. The method of the present invention comprises treating a system containing oil and water, where emulsions form, with a terpolymer solution. The terpolymer containing treatments of the present invention were found to be effective treatments for resolving (breaking or inhibiting) oil-in-water (reverse) and water-in-oil-in-water emulsions in petroleum processes. Particularly, these reverse emulsion breakers are effective for improving the water quality in steam-assisted gravity drainage (SAGD) processes. The reverse emulsion breakers disclosed herein are also typically water-soluble.

One aspect of the invention is a method of resolving a reverse emulsion in produced fluid of an oil production system comprising adding a reverse emulsion breaker to a produced fluid of the oil production system in an amount effective for resolving the reverse emulsion, the reverse emulsion breaker comprising a terpolymer, the terpolymer comprising repeat units of Formulae 1, 2, and 3:

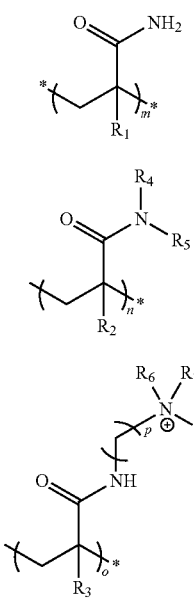

Formula 1

Formula 2

Formula 3 wherein $R_1$, $R_2$, and $R_3$ are independently hydrogen or alkyl; $R_4$, $R_5$, $R_6$, $R_7$, and $R_8$ are independently alkyl; p is an integer from 1 to 6; and m, n, and o are integers wherein the molecular weight of the terpolymer is from about 20,000 to about 20,000,000 Daltons.

Another aspect of the invention is a reverse emulsion breaker comprising a terpolymer, the terpolymer comprising repeat units of Formulae 1, 2, and 3:

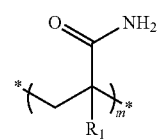

Formula 1

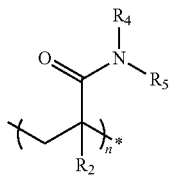

Formula 2

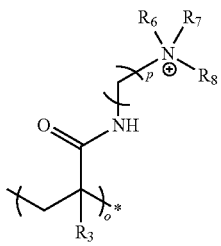

Formula 3 wherein $R_1$, $R_2$, and $R_3$ are independently hydrogen or alkyl; $R_4$, $R_5$, $R_6$, $R_7$, and $R_8$ are independently alkyl; p is an integer from 1 to 6; and m, n, and o are integers wherein the molecular weight of the terpolymer is from about 20,000 to about 20,000,000 Daltons.

Yet another aspect of the invention is a reverse emulsion breaker comprising a reaction product of a polymerization mixture comprising the monomers of Formulae 10, 20, and 30:

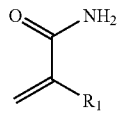

Formula 10

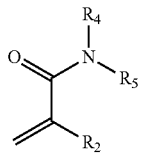

Formula 20

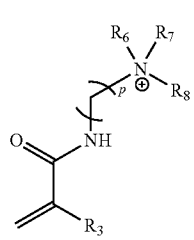

Formula 30 wherein $R_1$, $R_2$, and $R_3$ are independently hydrogen or alkyl; $R_4$, $R_5$, $R_6$, $R_7$, and $R_8$ are independently alkyl; p is an integer from 1 to 6; and m, n, and o are integers wherein the molecular weight of the terpolymer is from about 20,000 to about 20,000,000 Daltons.

Further, the reverse emulsion breaker described herein can be used in a method of resolving a reverse emulsion in produced fluids of an oil production system comprising adding the reverse emulsion breaker to the produced emulsion of the oil production system in an amount effective for resolving the reverse emulsion.

The reverse emulsion can be an oil-in-water emulsion, a water-in-oil-in-water emulsion, or a combination thereof. Particularly, the reverse emulsion can be a water-in-oil-in-water emulsion.

For the reverse emulsion breaker described herein, $R_1$, $R_2$, and $R_3$ can independently be hydrogen or methyl. Further, $R_1$ and $R_2$ are hydrogen and $R_3$ is methyl.

Further, $R_1$, $R_2$, and $R_3$ can be hydrogen.

Additionally, for the reverse emulsion breakers described herein, $R_4$, $R_5$, $R_6$, $R_7$, and $R_8$ can independently be methyl, ethyl, propyl, butyl, pentyl, or hexyl. Preferably, $R_4$, $R_5$, $R_6$, $R_7$, and $R_8$ are methyl.

Also, for the reverse emulsion breakers described herein, p can be 1 to 3.

For preferred reverse emulsion breakers, $R_1$ and $R_2$ are hydrogen; $R_3$ is methyl; $R_4$, $R_5$, $R_6$, $R_7$, and $R_8$ are methyl, and p is 3.

For repeat units of Formula 3, the monomer used to derive the repeat unit (e.g., Formula 30) can be [3-(methacryloylamino)propyl]trimethyl ammonium chloride (MAPTAC), [3-(acryloylamino)propyl]trimethyl ammonium chloride (APTAC), 2-acryloyloxyethyltrimethyl ammonium chloride (AETAC), 2-methacryloyloxyethyltrimethyl ammonium chloride (METAC), diallyldimethyl ammonium chloride (DADMAC), acryloyloxyethyldimethylbenzyl ammonium chloride (AEDBAC), methacryloyloxyethyldimethylbenzyl ammonium chloride (MEDBAC), or a combination thereof. Preferably, the monomer used to derive the repeat unit (e.g., Formula 30) can be [3-(methacryloylamino)propyl]trimethyl ammonium chloride (MAPTAC), [3-(acryloylamino)propyl]trimethyl ammonium chloride (APTAC), or a combination thereof.

For repeat units of Formula 2, the monomer used to derive the repeat unit (e.g., Formula 20) can be N,N-Dimethylacrylamide, N-isopropylacrylamide, N,N-diethylacrylamide, N-methylacrylamide, N-ethylacrylamide, N-propylacrylamide, or a combination thereof.

For repeat units of Formula 1, the monomer used to derive the repeat unit (e.g., Formula 10) can be acrylamide, methacrylamide, or a combination thereof.

The reverse emulsion breaker terpolymer can be a random polymer.

For the reverse emulsion breakers described herein, the value of m can provide from about 7 mole percent to about 93 mole percent of the repeat unit of Formula 1.

For the reverse emulsion breakers described herein, the value of n can provide from about 3 mole percent to about 89 mole percent of the repeat unit of Formula 2.

For the reverse emulsion breakers described herein, the value of o can provide from about 3 mole percent to about 31 mole percent of the repeat unit of Formula 3.

For the reverse emulsion breakers described herein, the value of m can provide from about 28 mole percent to about 32 mole percent of the repeat unit of Formula 1, the value of n provides from about 51 mole percent to about 55 mole percent of the repeat unit of Formula 2, and the value of o provides from about 14 mole percent to about 18 mole percent of the repeat unit of Formula 3.

The reverse emulsion breaker can be a terpolymer of Formula 1, Formula 2, and Formula 3, and have a molecular weight of from about 20,000 to about 20,000,000 Daltons, from about 300,000 to about 1,300,000 Daltons, or from about 800,000 to about 1,000,000 Daltons.

Preferably, the reverse emulsion breaker is water-soluble.

When the reverse emulsion breaker is used to break an emulsion in an oil production system, the emulsion can be in the produced fluid from a steam-assisted gravity drainage production system or a cyclic steam stimulation system.

Further, when the reverse emulsion breaker is used to break an emulsion in an oil production system, the produced fluid is from a steam-assisted gravity drainage production system.

The effective amount of the reverse emulsion breaker is from about 10 ppm to about 500 ppm based on the total volume of the produced fluid.

Preferably, the effective amount of the reverse emulsion breaker is from about 50 ppm to about 200 ppm based on the volume of the produced fluid.

Additionally, when the reverse emulsion breaker is used to break an emulsion in an oil production system, an emulsion breaker and the reverse emulsion breaker can be added to the produced fluid of the oil production system. The emulsion breaker can comprise an oxyalkylated phenol-formaldehyde resin, a resin ester, an oxyalkylated polyalkylamine, a polyol, a cross-linked polyol with a di- or multi-functional cross-linker, an isocyanate, an acid, or a combination thereof. The emulsion breaker comprises a mixture of the reverse emulsion breakers and the emulsion breakers depending on the properties of the particular produced fluid.

In some instances, the emulsion breaker and the reverse emulsion breaker have a synergistic effect for resolving the water-in-oil-in-water emulsion in the produced water of an oil production system.

The emulsion breaker can have a concentration from about 100 ppm to about 400 ppm.

A diluent can be added to the production system and the diluent can be condensate, naphtha, kerosene, light crude oil, or a combination thereof.

The terpolymers of the present invention can be prepared by solution, emulsion, or dispersion polymerization techniques.

Preferably, the terpolymers are prepared by solution polymerization; particularly by radical polymerization in aqueous solution. Generally, deionized water, a monomer inhibitor deactivator (e.g., ethylenediaminetetraacetate (EDTA)), a monomer of Formula 10, a monomer of Formula 20, and a monomer of Formula 30 are contacted with one another. The monomer inhibitor deactivator is present at a concentration of from about 0.05-0.3 wt. %, the monomers of Formulae 10 and 20 are added at a concentration of from about 5-85 wt. %, and the monomer of Formula 30 is added at a concentration of from about 10-50 wt. %. The solution is purged with an inert gas and then heated to a temperature from about 55-75° C. Once the desired temperature is reached the polymerization initiator (e.g., (E)-2,2'-(diazene-1,2-diyl)bis(2-methylpropanimidamide) is added. The reaction is heated for about 3-4 hours and then the reaction is ended using a quenching agent (e.g., sodium bisulfate) at a concentration of about 0.6 wt. % based on the amount of the monomers of Formulae 10, 20, and 30.

The reverse emulsion breaker can be dissolved in a solvent. The solvent can be methanol, ethylene glycol, propylene glycol.

The reverse emulsion breaker terpolymers of the present invention are preferably added to the inlet emulsion to a water and oil separating system. The water and oil separating system is depicted in FIG. 1 and comprises a production well 1 that produced a produced fluid carried in a produced fluid line 5. To the produced fluid line 5 can be added an emulsion breaker, a reverse emulsion breaker, or a combination thereof at injection point 10. When the reverse emulsion breaker is combined with the optional emulsion breaker, they can be injected independently, simultaneously, or sequentially. Further, a diluent can be injected at injection point 20. The produced fluid is then sent to one or more separation vessels 30. The separation vessels can be a free water knock out (FWKO) vessel, a heat treater, or a phase separator. The produced water from the separation vessel(s) is carried in a produced water line 40 to a flotation tank 60. The produced water from the flotation tank 60 is sent to a skim tank 70 where the bottoms are sent to a produced water tank through the produced water tank line 90 and recycled oil is skimmed from the surface of the liquid in the skim tank 70 and sent back to the produced fluid line 5 through the recycled oil line 80. The tops from the separation vessels are sent to the oil tank through the oil line 50.

The efficacy of the reverse emulsion breaker terpolymer is dependent upon a number of factors such as water drop, water quality, interface quality, oil dryness, and the like.

Emulsion stability is monitored by measuring phase separation at about 90° C. to about 150° C. using conventional bottle testing. The produced emulsion (100 mL) is poured in a 6 ounce prescription glass bottle and heated for approximately 30 to 60 minutes at about 90° C. to about 150° C. in a water bath. A diluent is added to the emulsion and mixed using a mechanical shaker at low speed for five minutes or mixed by shaking the bottle by hand. In some tests the mixed emulsion is placed back in the water bath at about 90° C. to about 150° C.; in other cases the next step is injection. The reverse emulsion breaker (REB), and optionally emulsion breaker (EB) and are injected at a designated dose, hand-shaken for 100 cycles (or in a shaker at low setting for 1 minute), and placed in the water bath at 90° C. for observation of water drop during 60-120 minutes. Basic sediments and water (BS&W) are determined by diluting 6 mL of the oil close to the interface with 6 mL xylene, toluene, or mineral spirits (e.g., Varsol™) and centrifuging for five minutes. Water clarity was ranked on a comparative visual scale from 11 (partially broken reverse) to a 1 (≤50 NTU). A rating of 9 could be deemed equivalent to 1500 NTU, while a rating of 4 or 5 would be equal to about 500 NTU.

Having described the invention in detail, it will be apparent that modifications and variations are possible without departing from the scope of the invention defined in the appended claims.

EXAMPLES

The following non-limiting examples are provided to further illustrate the present invention.

Example 1

General Procedure for Polymerization

The polymers were prepared by radical polymerization in aqueous solution. The polymerization initiator used was (E)-2,2'-(diazene-1,2-diyl)bis(2-methylpropanimidamide) having a trade name V-50. The concentration of the initiator ranged between about 0.5% to about 2% of the monomers by weight. Ethylenediaminetetraacetate (EDTA) was used as a monomer inhibitor deactivator at a concentration of 0.05-0.3% of the total weight of the monomers. Sodium bisulfite was used at the end of the reaction at a concentration of about 0.6 wt. % based on the total starting weight of the monomers to reduce unreacted monomers. The weight percent range for acrylamide and dimethylacrylamide monomers were 5-85 wt. %. The weight percent of the 3-methacrylamidopropyl-trimethyl-ammonium chloride (aka 3-trimethylammoniumpropylmethacrylamide chloride) (MAPTAC) monomer ranged from 10-50 wt. %. The polymerization temperature ranged from 55-75° C. with 60° C. being preferred.

Deionized water, EDTA, dimethylacrylamide, methacrylamidopropyl-trimethyl-ammonium chloride (50% w/w in water) and acrylamide (49.5% w/w in water) were placed in a three neck round bottom flask. The solution was purged with nitrogen for 30 minutes at room temperature. The solution was then heated to 60° C. and the initiator, (E)-2,2'-(diazene-1,2-diyl)bis(2-methylpropanimidamide), was added. The reaction was heated to temperature for 3-4 hours. Sodium bisulfite was then added and the reaction was stirred for an additional 30 minutes. The amounts of each material are listed in the following tables for preparation of samples A-C.

| Sample A | | |
| --- | --- | --- |
| Component | Mole % | Wt. % |
| dimethylacrylamide | 44.99 | 4.359 |
| acrylamide 49.5% | 44.88 | 6.295 |
| 3-trimethylammonium propyl methacrylamide chloride (50%) | 10.13 | 4.369 |
| EDTA | | 0.012 |
| V-50 | | 0.108 |
| DI water | | 84.795 |
| sodium metabisulfite | | 0.062 |

| Sample B | | |
| --- | --- | --- |
| Component | Mole % | Wt. % |
| dimethylacrylamide | 20.0 | 2.137 |
| acrylamide 49.5% | 69.8 | 10.791 |
| 3-trimethylammonium propyl methacrylamide chloride (50%) | 10.2 | 4.857 |
| EDTA | | 0.020 |
| V-50 | | 0.155 |
| DI water | | 81.971 |
| sodium metabisulfite | | 0.068 |

| Sample C | | |
| --- | --- | --- |
| Component | Mole % | Wt. % |
| dimethylacrylamide | 69.7 | 6.612 |
| acrylamide 49.5% | 20.0 | 2.742 |
| 3-trimethylammonium propyl methacrylamide chloride (50%) | 10.29 | 4.347 |
| EDTA | | 0.005 |
| V-50 | | 0.107 |
| DI water | | 86.126 |
| sodium metabisulfite | | 0.061 |

Emulsion stability was monitored by measuring phase separation at about 90° C. using conventional bottle testing. The produced emulsion (100 mL) was poured in a 6 ounce prescription glass bottle and heated for approximately 30 to 60 minutes at about 90° C. in a water bath. A diluent was added to the emulsion and mixed using a mechanical shaker at low speed for five minutes or mixed by shaking the bottle by hand. In some tests the mixed emulsion was placed back in the water bath at 90° C. and in other cases the next step was injection of the reverse emulsion breaker and optionally, the emulsion breaker into the emulsion. The flow sheet of the production plant that is being mimicked determines whether the emulsion was placed back into the water bath or if the reverse emulsion breaker, and optionally, the emulsion breaker were injected into the emulsion. An emulsion breaker (EB) and a reverse emulsion breaker (REB) was injected by syringe at a designated dose, shook by hand for 100 cycles, and placed in the water bath at 90° C. for observation during 60-120 minutes. Basic sediments and water (BS&W) were determined by diluting 6 mL of the oil close to the interface with 6 mL xylene, toluene, or mineral spirits (e.g., Varsol™) and centrifuging for five minutes. Water clarity was ranked on a comparative visual scale from 11 (partially broken reverse) to a 1 (≤50 NTU). A rating of 9 could be deemed equivalent to 1500 NTU, while a rating of 4 or 5 would be equal to about 500 NTU. EB A, EB B, REB 1, REB 2, and REB 3 are incumbent products.

| Canada SAGD location 1: EB A (polyol/resin blend) | | | | | | | |
|---|---|---|---|---|---|---|---|
| | Conc. | Water Drop (min) | | | | Water Quality | Water Quality |
| REB | (ppm) | 5 | 15 | 30 | 45 | 60 | 10 min | 60 min |
| REB 1 (polyamine quat) | 90 | 45 | 62 | 65 | 65 | 65 | 8 | 8 |
| A | 90 | 60 | 60 | 62 | 62 | 62 | 4 | 4 |
| B | 90 | 63 | 65 | 65 | 65 | 67 | 4 | 4 |
| C | 90 | 65 | 67 | 67 | 67 | 68 | 4 | 4 |

| REB | Conc. (ppm) | WD 30 min (%) | WQ | BS&W |
|---|---|---|---|---|
| Canada SAGD location 1: EB A (polyol/resin blend) | | | | |
| REB 2 (polyamine quat) | 100 | 67 | 10 | 1.0 |
| REB 3 (polyamine quat) | 100 | 45 | 8 | 1.2 |
| A | 100 | 60 | 3 | 1.2 |
| B | 100 | 80 | 5 | 2.4 |
| C | 100 | 80 | 6 | 2.4 |
| Canada SAGD location 2: EB B (polyol/resin blend) | | | | |
| REB (polyamine quat) | 77 | 66 | 1 | 0.4 |
| C | 100 | 69 | 1 | 0.4 |

| Canada SAGD location 1: EB A (polyol/resin blend) | | | | |
|---|---|---|---|---|
| REB | Conc. (ppm) | WD 30 min (%) | WQ | BS&W |
| REB 1 (polyamine quat) | 100 | 50 | 6 | 5.2 |
| C | 100 | 60 | 6 | 3.3 |
| E | 100 | 60 | 7 | 6.5 |
| F | 100 | 63 | 4 | 4.0 |
| G | 100 | 50 | 3 | 3.6 |

| Example | Monomer mole ratio: Dimethylacrylamide/acrylamide/MAPTAC |
|---|---|
| A | 45/45/10 |
| B | 20/70/10 |
| C | 70/20/10 |
| D | 10/80/10 |
| E | 15/75/10 |
| F | 25/65/10 |
| G | 30/60/10 |
| H | 20/74/6 |

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and methods without departing from the scope of the invention, it is intended that all matter contained in the above description and shown in the accompanying drawings shall be interpreted as illustrative and not in a limiting sense.

What is claimed is:

1. A reverse emulsion breaker comprising a terpolymer, the terpolymer comprising repeat units of Formulae 1, 2, and 3:

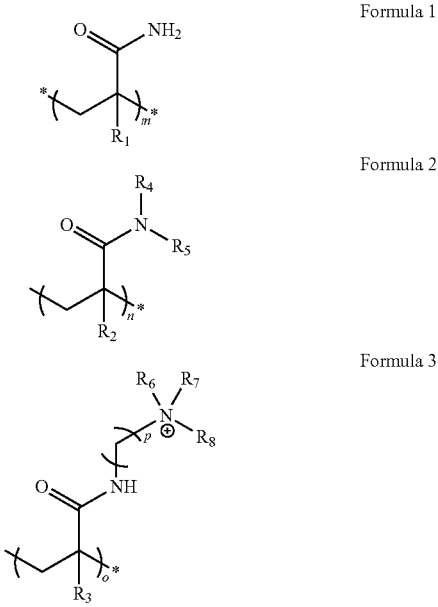

wherein
$R_1$, $R_2$, and $R_3$ are independently hydrogen or alkyl;
$R_4$, $R_5$, $R_6$, $R_7$, and $R_8$ are independently alkyl;
p is an integer from 1 to 6; and
m, n, and o are integers wherein the molecular weight of the terpolymer is from about 300,000 to about 1,300,000 Daltons and n is an integer providing from about 3 mole percent to about 89 mole percent of the repeat unit of Formula 2.

2. The reverse emulsion breaker of claim 1, wherein $R_1$ and $R_2$ are hydrogen; $R_3$ is methyl; $R_4$, $R_5$, $R_6$, $R_7$, and $R_8$ are methyl, and p is 3.

3. The reverse emulsion breaker of claim 1 wherein $R_1$, $R_2$, and $R_3$ are independently hydrogen or methyl.

4. The reverse emulsion breaker of claim 3 wherein $R_1$ and $R_2$ are hydrogen.

5. The reverse emulsion breaker of claim 3 wherein $R_4$, $R_5$, $R_6$, $R_7$, and $R_8$ are independently methyl, ethyl, propyl, butyl, pentyl, or hexyl.

6. The reverse emulsion breaker of claim 5 wherein $R_4$, $R_5$, $R_6$, $R_7$, and $R_8$ are methyl.

7. The reverse emulsion breaker of claim 5 wherein p is 1 to 3.

8. The reverse emulsion breaker of claim 1, wherein the molecular weight of the terpolymer is from about 800,000 to about 1,000,000 Daltons.

9. The reverse emulsion breaker of claim 1 wherein the reverse emulsion breaker is water-soluble.

10. A reverse emulsion breaker comprising a terpolymer, the terpolymer consisting essentially of repeat units of Formulae 1, 2, and 3:

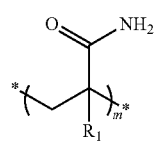

Formula 1

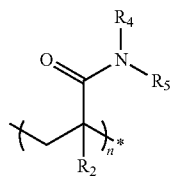

Formula 2

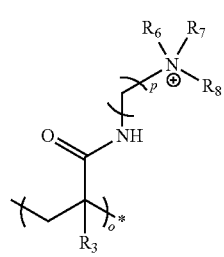

Formula 3 wherein
$R_1$, $R_2$, and $R_3$ are independently hydrogen or alkyl;
$R_4$ and $R_5$ are independently methyl, ethyl, or propyl;
$R_6$, $R_7$, and $R_8$ are independently alkyl;
p is an integer from 1 to 6; and
m, n, and o are integers wherein the molecular weight of the terpolymer is from about 20,000 to about 20,000,000 Daltons.

11. The reverse emulsion breaker of claim 10, wherein $R_1$ and $R_2$ are hydrogen; $R_3$ is methyl; $R_4$, $R_5$, $R_6$, $R_7$, and $R_8$ are methyl, and p is 3.

12. The reverse emulsion breaker of claim 10 wherein $R_1$, $R_2$, and $R_3$ are independently hydrogen or methyl.

13. The reverse emulsion breaker of claim 12 wherein $R_1$ and $R_2$ are hydrogen.

14. The reverse emulsion breaker of claim 12 wherein $R_6$, $R_7$, and $R_8$ are independently methyl, ethyl, propyl, butyl, pentyl, or hexyl.

15. The reverse emulsion breaker of claim 14 wherein $R_4$, $R_5$, $R_6$, $R_7$, and $R_8$ are methyl.

16. The reverse emulsion breaker of claim 14 wherein p is 1 to 3.

17. The reverse emulsion breaker of claim 10, wherein the molecular weight of the terpolymer is from about 300,000 to about 1,300,000 Daltons.

18. The reverse emulsion breaker of claim 10, wherein the molecular weight of the terpolymer is from about 800,000 to about 1,000,000 Daltons.

19. The reverse emulsion breaker of claim 10 wherein the reverse emulsion breaker is water-soluble.

* * * * *